United States Patent [19]
Yokoyama et al.

[11] Patent Number: 5,760,713
[45] Date of Patent: Jun. 2, 1998

[54] NAVIGATION SYSTEM OF A VEHICLE

[75] Inventors: Shoji Yokoyama, Tokyo-to; Nobuaki Miki, Aichi-ken; Muneo Kusafuka, Aichi-ken; Yoshitaka Murase, Aichi-ken, all of Japan

[73] Assignees: Kabushiki Equos Research; Aisin AW Co., Ltd, both of Japan

[21] Appl. No.: 765,747
[22] PCT Filed: May 10, 1996
[86] PCT No.: PCT/JP96/01240
    § 371 Date: Mar. 3, 1997
    § 102(e) Date: Mar. 3, 1997
[87] PCT Pub. No.: WO96/35924
    PCT Pub. Date: Nov. 14, 1996

[30] Foreign Application Priority Data

May 10, 1995 [JP] Japan .................................. 7-135685

[51] Int. Cl.⁶ .................................................. G08G 1/123
[52] U.S. Cl. ........................... 340/995; 340/990; 340/905; 701/202; 701/209; 701/211
[58] Field of Search ........................ 340/995, 988, 340/990, 905; 364/443, 444.1, 444.2, 449.3, 449.5; 701/200, 201, 202, 207, 208, 209, 211

[56] References Cited

U.S. PATENT DOCUMENTS

| | | | |
|---|---|---|---|
| 5,311,173 | 5/1994 | Komura et al. | 340/995 |
| 5,539,399 | 7/1996 | Takahira et al. | 340/995 |
| 5,568,390 | 10/1996 | Hirota et al. | 701/201 |
| 5,574,649 | 11/1996 | Levy | 701/207 |

Primary Examiner—Jeffery A. Hofsass
Assistant Examiner—Benjamin C. Lee
Attorney, Agent, or Firm—Lorusso & Loud

[57] ABSTRACT

To make it possible to search a route suitable to drive and provide guidance thereof in accordance with acceleration resistance of the vehicle, a load condition detection unit obtains reference acceleration on the basis of a throttle opening obtained by a throttle opening obtaining unit and torque of an engine obtainable from a rotational frequency of the engine detected by a first rotation sensor. The load condition detection unit compares the reference acceleration with real acceleration obtainable by differentiating a vehicle velocity obtainable by a vehicle velocity sensor to detect acceleration resistance of the vehicle. A main controller unit extracts an available road on the basis of the acceleration resistance of the vehicle and road data stored in a road data memory unit of a map data memory unit. The main controller unit searches a route by utilizing the available road thus extracted and provide guidance thereof.

2 Claims, 6 Drawing Sheets

NAVIGATION SYSTEM OF A VEHICLE

TECHNICAL FIELD

The present invention relates to a navigation system of a vehicle that searches a route suitable for driving in accordance with acceleration resistance of the vehicle and that provides guidance of the route.

BACKGROUND ART

Recently, a navigation system of a vehicle has been provided and by which guidance of a route to a destination is given to a driver who fails to know his or her way to the destination. The vehicle navigation system stores road data in a memory unit and searches a driving route of the automobile from a present location to the destination on the basis of the road data to provide the route guidance according to the present location of the vehicle.

The conventional navigation system of the vehicle, however, searches the route and provides the route guidance in the same manner of a normal mode even when a big driving load, except for a load due to a slope, is subjected to the vehicle in such a case of driving with a trailer or a case of carrying a heavy load. Therefore, the navigation system might show a slope road or a narrow road on which driving is not easy and adequate accelerating and braking can not be expected.

It is an object of the present invention to provide a navigation system of a vehicle which is capable of searching a route suitable for driving in accordance with acceleration resistance of the vehicle and provides guidance of the route thus searched.

DISCLOSURE OF INVENTION

The present invention has a navigation system of a vehicle comprise input means for inputting information including a destination, store means for storing road information necessary for searching a route and for guiding the route, acceleration resistance detection means for detecting acceleration resistance of the vehicle, route search means for extracting an available road or roads on the basis of the acceleration resistance detected by the acceleration resistance detection means and the road or roads information stored in the store means, and for searching a route to the destination input from the input means by utilizing the available road thus extracted, and route guide means for providing route guidance according to the route searched by the route search means.

According to the present invention, the road information necessary for searching the route and for guiding the route is stored in the store means, and the acceleration resistance of the vehicle is detected by the acceleration resistance detection means. And, the available road is extracted by the route search means on the basis of the acceleration resistance detected by the acceleration resistance detection means and the road information stored in the store means. The route to the destination that is input from the input means is searched by utilizing the available road thus extracted by the route search means. The route guidance is provided according to the route thus searched by the route guide means.

The present invention arranges the acceleration resistance detection means of the vehicle navigation system to compare reference acceleration obtained from torque of an engine with real acceleration obtained from a velocity of the vehicle to detect a data relating to a load condition, except for slope resistance, of the vehicle. That is, the reference acceleration obtained from the torque of the engine is compared with the real acceleration obtained from the velocity of the vehicle by the acceleration resistance detection means to detect the acceleration resistance of the vehicle.

BEST MODE FOR CARRYING OUT THE INVENTION

Detailed description to a vehicle navigation system of a preferred embodiment of the present invention will be made with reference to FIGS. 1 to 9.

Figure 1:
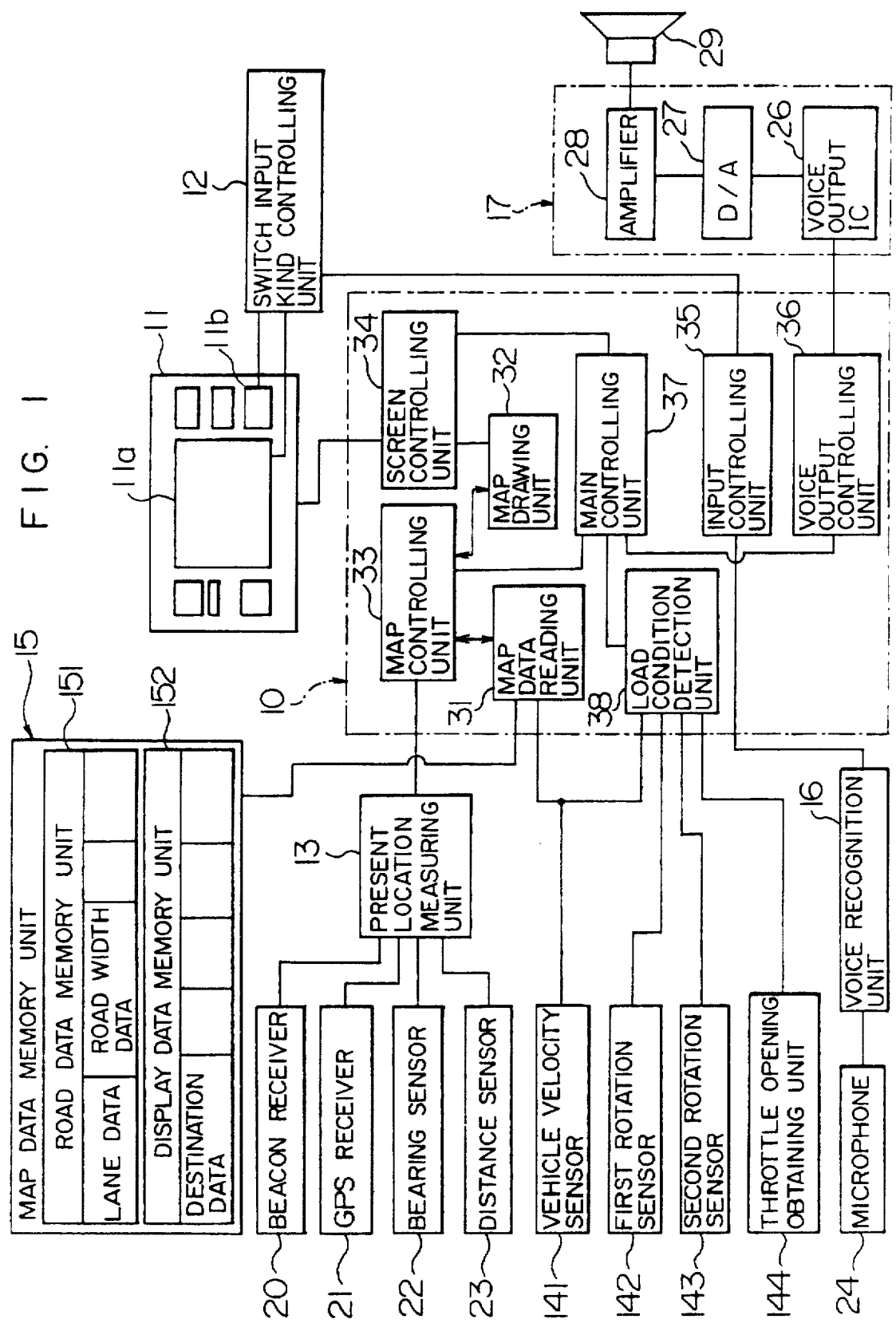
FIG. 1 is a block diagram showing a configuration of a vehicle navigation system of an embodiment of the present invention.

FIG. 1 is a block diagram showing a configuration of the vehicle navigation system of the embodiment of the present invention.

The vehicle navigation system comprises a processing unit 10. A display unit 11 including a display 11a functioning as a touch panel and a switch 11b disposed around the display 11a, a switch input kind controlling unit 12 for controlling an input from the touch panel or the switch 11b of the display unit 11, a present location measuring unit 13, a vehicle velocity sensor 41 for detecting a velocity of the vehicle, a first rotation sensor 141 for detecting a rotational frequency of an engine, a second rotation sensor 142 for detecting an output rotational frequency from a transmission, a throttle opening obtaining unit 144 for obtaining information in a throttle opening from an engine controller not shown, a map data memory unit 15, a voice recognition unit 16 and a voice output unit 17 are connected to the processing unit 10.

The present location measuring unit 13 detects the present location at which the vehicle moving or staying by detecting coordinate data in terms of latitude and longitude. A GPS (Global Position System) receiver 21 for measuring a position of the vehicle by utilizing an artificial satellite, a beacon receiver 20 for receiving location information from beacons disposed on the road, a bearing sensor 22 and a distance sensor 23 are connected to the present location measuring unit 13. The present location measuring unit 13 measures the present location of the vehicle by utilizing the information therefrom.

As the bearing sensor 22, all sorts of methods are available such as, for example, a geomagnetic sensor for obtaining a direction of the vehicle by detecting a geomagnetic field, a gyroscope such as a gas-rate gyroscope or an optical fiber gyroscope for detecting a rotational angular velocity of the vehicle to obtain a direction of the vehicle by integrating the angular velocity thus detected, or wheel sensors disposed to a right wheel and a left wheel of the vehicle respectively for calculating a directional displacement of the vehicle by detecting turning of the vehicle due to a difference between pulses (a difference in moving distance) output from the respective wheel sensors is used. As the distance sensor 23, all sorts of methods such as detecting a rotational frequency of a wheel to calculate the distance or detecting acceleration to twice integrate the acceleration thus detected are used.

Incidentally, the GPS receiver 21 and the beacon receiver 20 can measure a location by itself. However, the present location is detected by a dead-reckoning navigation utilizing both the bearing sensor 22 and the distance sensor 23 in an area where the receiving by the GPS receiver 21 or the beacon receiver 20 is not possible.

The map data memory unit 15 comprises a road data memory unit 151 storing road data necessary for searching a route and for guiding the route thus searched and a display data memory unit 152 for storing display data. The road data memory unit 151 stores road data that are the data, such as intersections, nodes, and roads, utilized for searching the route. The road data includes all sorts of data relating to respective roads such as traffic lanes, widths of the road, height limits, weight limits, radii of curvature of corners and inclination angles. The display data memory unit stores destination data that is a selective data relating to the destination displayed on a map together with the roads and a background data such as buildings, traffic facilities or rivers displayed on the map together with the roads. A microphone 24 for inputting a voice is connected to the voice recognition unit 16.

A voice output unit 17 comprises a voice output IC 26 for outputting a voice as a digital signal, a D/A converter 27 for converting an output of the voice output IC 26 in a digital to analog fashion, and an amplifier 28 for amplifying an output of the D/A converter 27. A speaker 29 is connected to an output terminal of the amplifier 28.

The processing unit 10 comprises a map data reading unit 31 connected to the vehicle velocity sensor 141 and to the map data memory unit 15 for reading the data stored in the map data memory unit 15, a map drawing unit 32 for drawing a map by utilizing the data stored in the map data memory unit 15, a map controlling unit 33 for controlling the map data reading unit 31 and the map drawing unit 32, a screen controlling unit 34 connected to the map drawing unit 32 and the display unit 11 for controlling a screen of the display 11a.

Furthermore, the processing unit 10 comprises an input controlling unit 35 connected to the switch input kind controlling unit 12 and the voice recognition unit 16 for controlling inputs therefrom, a voice output controlling unit 36 connected to the voice output IC 26 of the voice output unit 17 for controlling voice output, a load condition detection unit 38 connected to the vehicle velocity sensor 141, the first rotation sensor 142, the second rotation sensor 143 and the throttle opening obtaining unit 144 for detecting the load condition (acceleration resistance) of the vehicle and a main controlling unit 37 for controlling the map controlling unit 33, the screen controlling unit 34, the input controlling unit 35, the voice output controlling unit 36 and the load condition detection unit 38.

The processing unit 10 comprises a CPU(central processing unit), a ROM(read only memory), a RAM(random access memory) and so on. The CPU executes a program stored in the ROM where the RAM is used as a working area to practice the above-mentioned units.

The RAM is arranged to store a value of search kind data F for distinguishing a route search in a normal mode from a route search in a trailing or the like mode. In the vehicle navigation system of the present embodiment, for example, the value of search kind data F is initialized as "0" when an ignition key turns on. In the search kind data F, F=1 shows a condition that the route search in the trailing or the like mode has been done and F=2 shows a condition that the route search in the normal mode has been done.

Next, explanation to an operation of the vehicle navigation system of the present embodiment will be made by referring to a flow chart in FIG. 2.

A user inputs his destination by his hand through the touch panel or the switch 11b of the display unit 11 or by his voice through the microphone 24. The information input from the touch panel or the switch 11b is delivered to the main controlling unit 37 through the switch input kind controlling unit 12 and the input controlling unit 35. The information input from microphone 24 by the voice is recognized by the voice recognition unit 16 and is delivered to the main controlling unit 37 through the input controlling unit 35.

Figure 2:
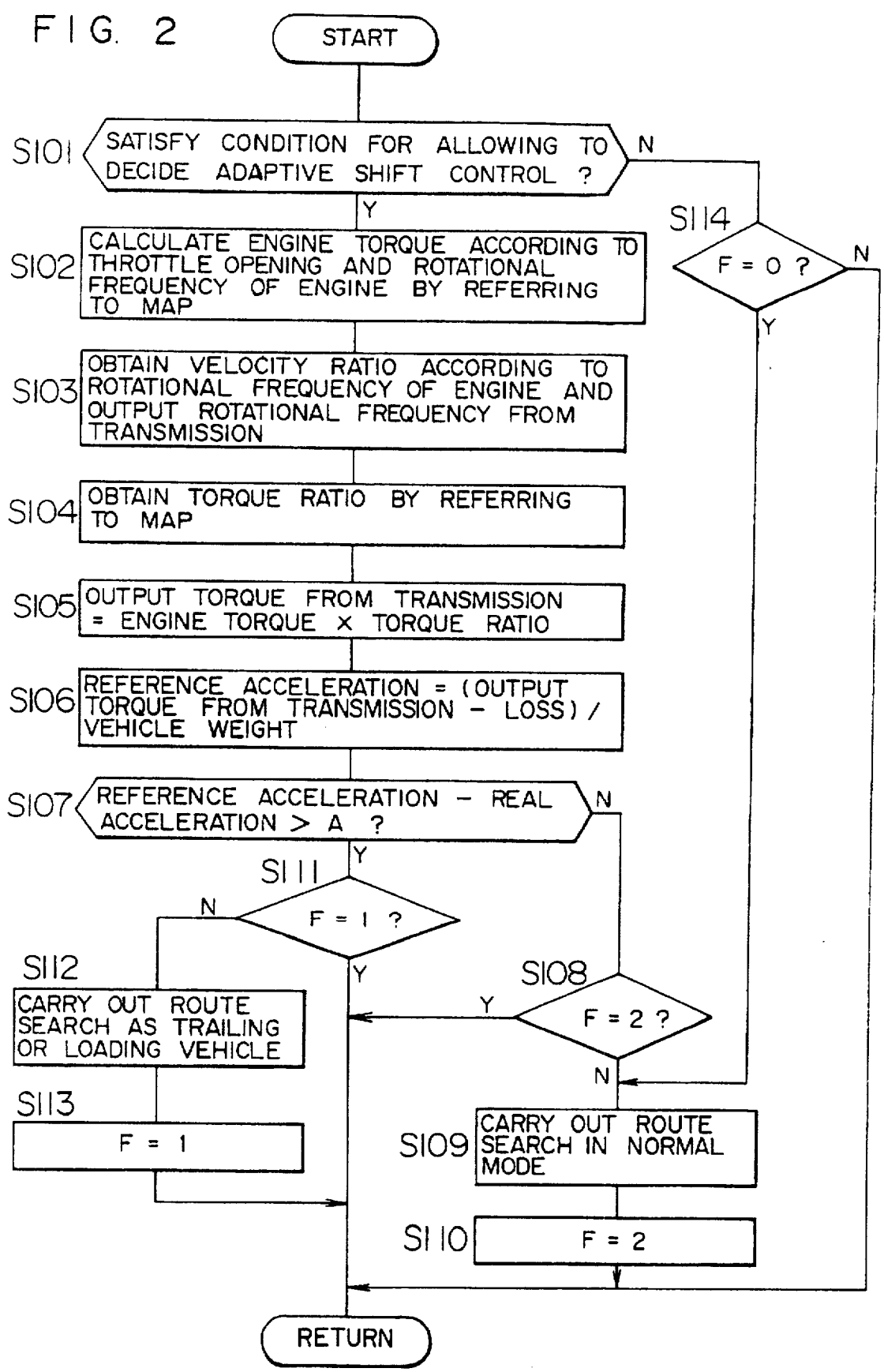
FIG. 2 is a flow chart showing an operation of the vehicle navigation system.

The vehicle navigation system starts the processing shown in FIG. 2 on receiving a command of the search for a route. In the processing, at first, the main controlling unit 37 decides whether a condition allowing to decide adaptive shift control is satisfied or not (at step 101).

Here, the condition allowing to decide adaptive shift control is consisted of the following six requirements. That is, (a) 5 km/h<a vehicle velocity<120 km/h, (b) 40° C.<an oil temperature, (c) a velocity is not varying, (d) in go forward range (a shift lever is positioned at a sift lever position of forward such as low, second, third or drive), (e) neither in failure detection (in a case where a sensor or the like such as the vehicle velocity sensor, the rotation sensor, the throttle sensor, an oil temperature sensor, a switch of detecting the shift lever position, a solenoid (an actuator) is in trouble) nor confirmed, (f) a road at the present location is flat. The condition of allowing to decide adaptive shift control is satisfied when the six requirements meet the above.

Here, the decision whether the road at the present location is flat or not is carried out by, for example, a difference in a height above sea level between two points on the road on which the vehicle positions is calculated in accordance with height data stored in the road data memory unit 151. Furthermore, disposing an inclination sensor in a driving direction on the vehicle and the decision whether the road is flat or not may be carried out in accordance with the measurement value of the sensor. Furthermore, storing inclination data indicating an inclination angle of the road having an inclination angle over a threshold angle in the road data memory unit 151, and the decision whether the road is flat or not may be carried out in accordance with whether the inclination data exists or not and the value of the inclination angle.

In a case where the condition for allowing to decide the adaptive shift control is satisfied (Y), the load condition detection unit 38 detects the load condition (acceleration resistance) of the vehicle as described below.

At first, engine torque is calculated according to a throttle opening obtained by the throttle opening obtaining unit 144 and a rotational frequency of the engine obtained by the first rotation sensor 142 by referring to a map showing an interrelation among the throttle opening, the rotational frequency of the engine and the engine torque (step 102). Next, obtaining a velocity ratio in accordance with the rotational frequency of the engine and an output rotational frequency from the transmission detected by the second rotation sensor 143 (step 103). Thereafter, a torque ratio is obtained in accordance with the velocity ratio by referring to a map showing an interrelation between the velocity ratio and the torque ratio (step 104).

Next, calculating output torque from the transmission by multiplying the engine torque with the torque ratio (step 105). Reference acceleration obtainable from the engine torque is calculated by subtracting a loss such as a gear loss and air resistance from the output torque from the transmission and dividing the remainder by a vehicle weight (step 106).

Then, deciding whether a remainder obtained by subtracting a real acceleration from the reference acceleration exceeds the predetermined value A or not (step 107). That is, detecting the load condition (acceleration resistance) of the vehicle.

Incidentally, the real acceleration is obtained by differentiating the vehicle velocity detected by the vehicle velocity sensor 141. Furthermore, the predetermined value A is so set, for example, that a difference between the reference acceleration and the real acceleration exceeds the value A at trailing a something of 1 ton or more or loading the load of 1 ton or more.

In step 107, when the remainder that is obtained by subtracting the real acceleration from the reference acceleration does not exceed the value A (;N), deciding whether the search kind data F equals 2 or not (step 108). In a case where the search kind data F does not equal 2 (step 108;N), that is, F=0 or F=1, the main controlling unit 37 searches the best route from the present location measured by the present location measurement unit 13 to the destination (step 109).

Here, F=0 denotes a case in which no route search to the destination has been carried out and the initial route search will be made, for example before driving. F=1 denotes a case in which the route search in the trailing or the like mode has been carried out but the trailing or loading has finished so that the route search (the route search in the normal mode) will be made again.

The route search in the normal mode is carried out by conventional route search in which mountains or a steep slope is not distinguished from a normal road and the former is also included in the object to be searched. After finishing the route search in the normal mode, setting the search kind data F=2 (step 110) to return to a main routine.

In step 108, when the search kind data F=2 (;Y), returning to the main routine because the route search in the normal mode has been done.

On the other hand, in step 107, when the remainder that is obtained by subtracting the real acceleration from the reference acceleration exceeds the value A (step 107;Y), deciding whether the search kind data data F equals 1 or not (step 111). In a case where the search kind data F does not equal 1 (step 111;N), that is, F=0 or F=2, the main controlling unit 37 searches the route as a trailing or loading vehicle (step 112).

Here, F=0 means a case of carrying out the initial route search. F=2 means a case in which the route search in the normal mode has been done but a trailing drive or a loading drive started in a middle of the route so that route to the destination will be searched again.

In a case where the route is searched for the trailing or loading vehicle, the main controlling unit 37 excludes the road inadequate to drive such as a narrow road, a steep slope or a winding road and extracts the road possible to drive. The main controlling unit searches the route from the present location to the destination by utilizing the road possible to drive thus extracted.

After finishing the route search in the trailing or the like mode, setting the search kind data F=1 (step 113) to return to the main routine In step 111, when the search kind data F=1 (;Y), returning to the main routine because the route search in the trailing or the like mode has been done.

In step 101, the condition of allowing to decide adaptive shift control fails to be satisfied(;N), deciding whether the search kind data F=0 or not (step 114). When it is not F=0 (step 114;N), returning to the main routine, that is, because the route search in the trailing or the like mode has been done where the data F=1 and the route search in the normal mode has been done where the data F=2.

On the other hand, when the search kind data F=0 (step 114;Y), going to step 109 to carry out the route search in the normal mode because the condition of allowing to decide adaptive shift control fails to be satisfied, though it is necessary to do the initial route search because the route to the destination has not been searched as before driving, for example.

After carrying out the route search in the normal mode or the route search in the trailing or the like mode as mentioned above, the main controlling unit 37 provides the route guidance according to the route thus searched by displaying a map on the display 11a or by the voice guidance output from the voice output unit 17.

Here, explanation that the load condition (acceleration resistance) of the vehicle can be detected according to a difference between the reference acceleration and the real acceleration will be made with reference to FIGS. 3 to 8.

In these figures, reference 51 denotes reference acceleration (m/sec2), reference 52 denotes real acceleration (m/sec), reference 53 denotes a throttle opening(%), reference 54 denotes a rotational frequency of an engine (rpm) and reference 55 denotes a gear (position).

Figure 3:
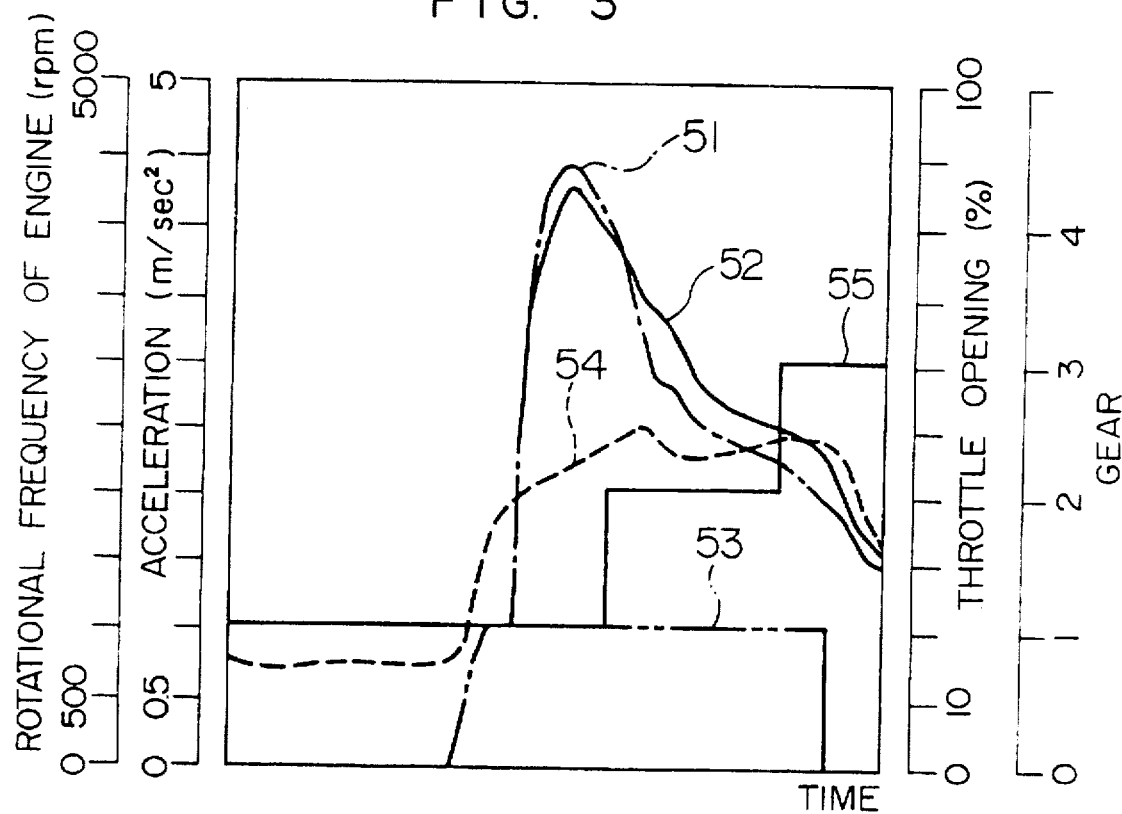
FIG. 3 is a characteristic graph showing time charts of reference acceleration, a real velocity and so on in a condition that a throttle opening is approximately 20% in a normal mode.

FIG. 3 shows time charts of the above-mentioned parameters in a condition that the throttle opening is approximately 20% in the normal mode without trailing.

Figure 4:
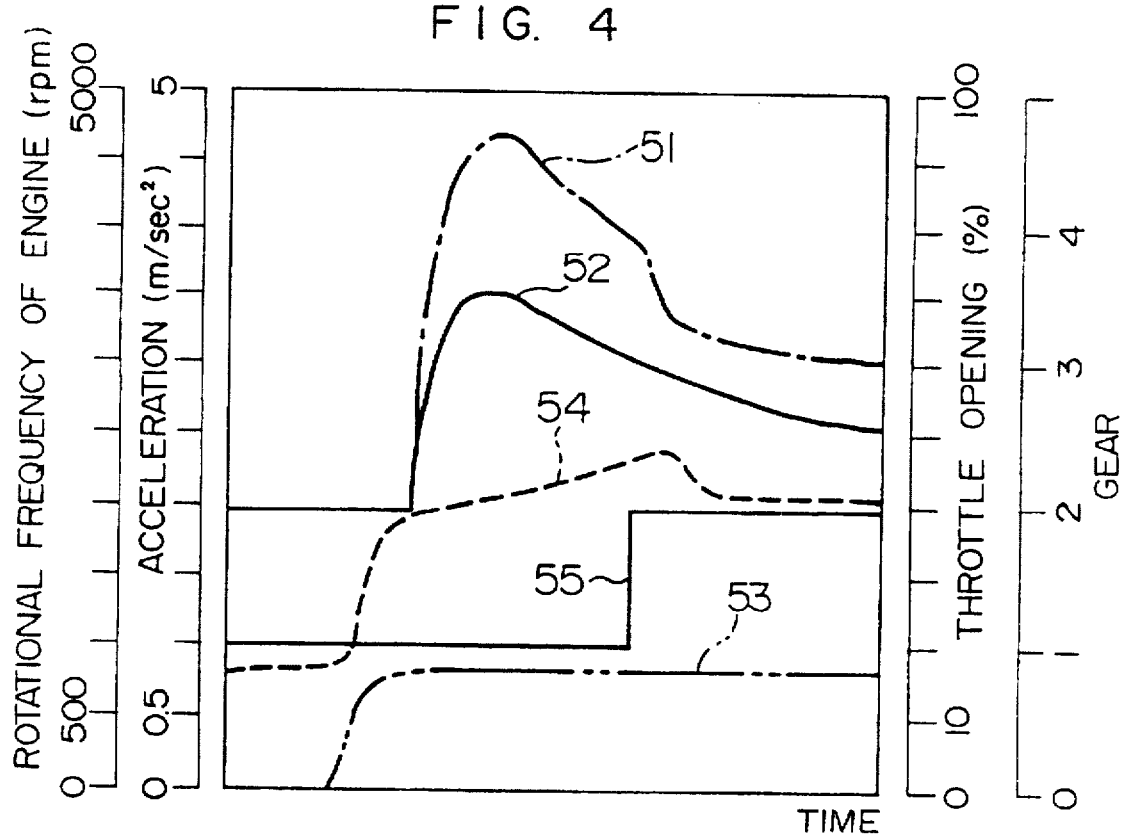
FIG. 4 is a characteristic graph showing time charts of reference acceleration, a real velocity and so on in a condition that a throttle opening is approximately 20% in a trailing mode.
Figure 5:
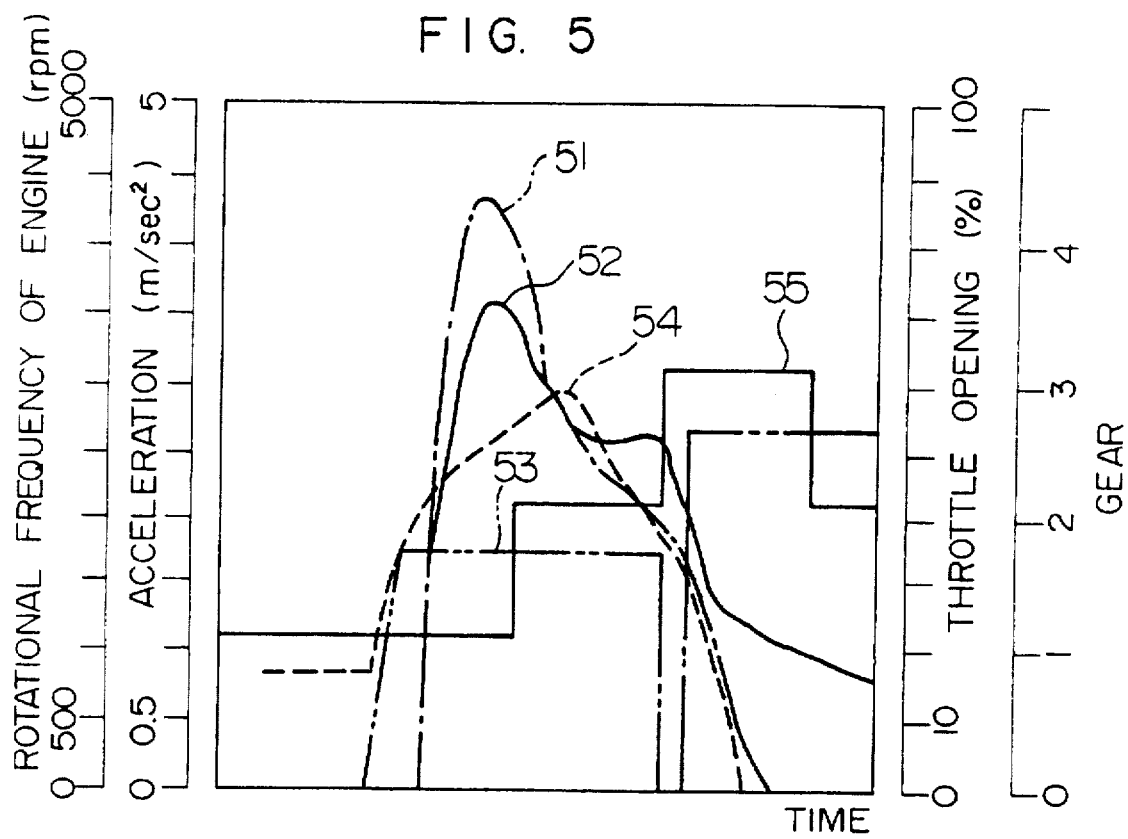
FIG. 5 is a characteristic graph showing time charts of reference acceleration, a real velocity and so on in a condition that a throttle opening is approximately 30% in a normal mode.
Figure 6:
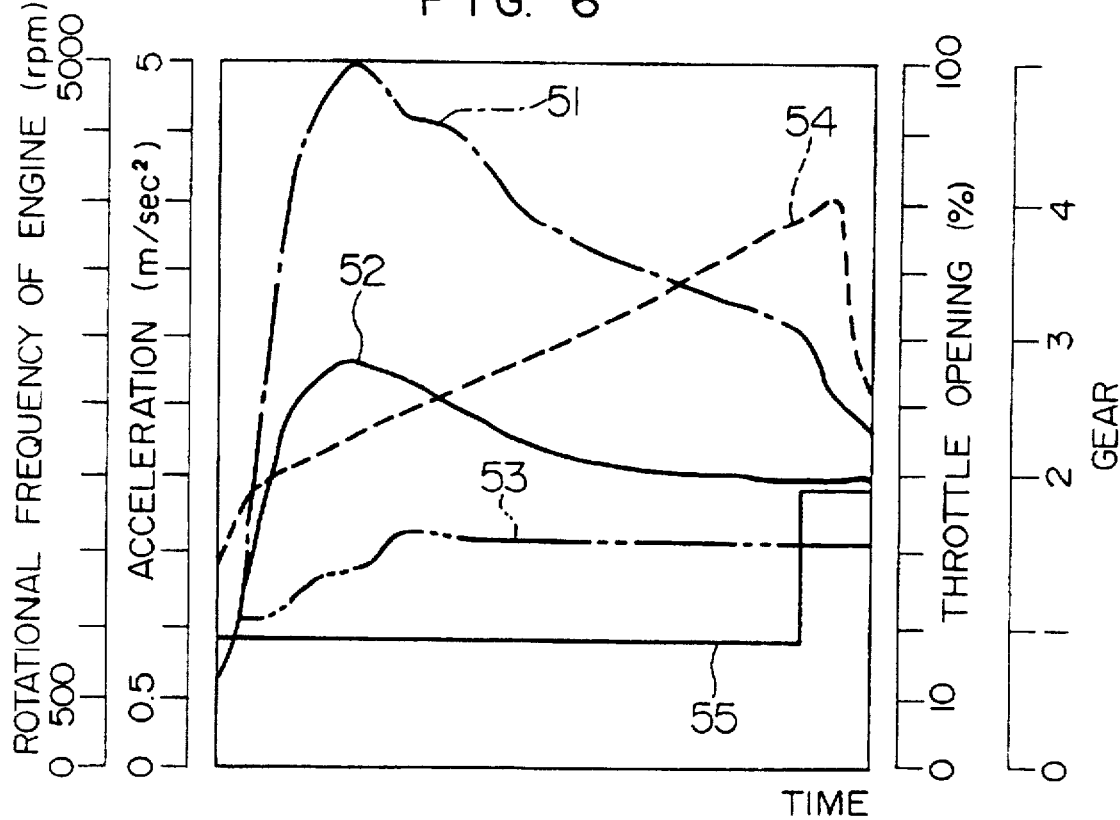
FIG. 6 is a characteristic graph showing time charts of reference acceleration, a real velocity and so on in a condition that a throttle opening is approximately 30% in a trailing mode.
Figure 7:
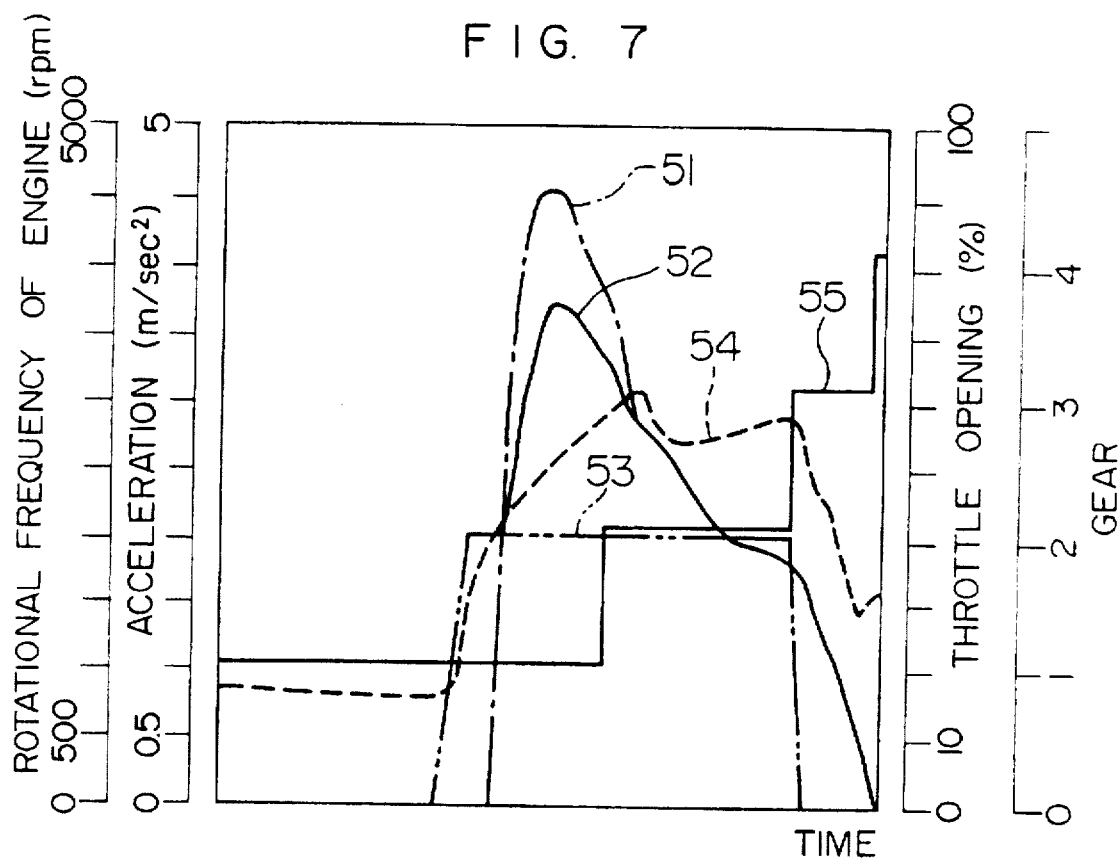
FIG. 7 is a characteristic graph showing time charts of reference acceleration, a real velocity and so on in a condition that a throttle opening is approximately 40% in a normal mode.
Figure 8:
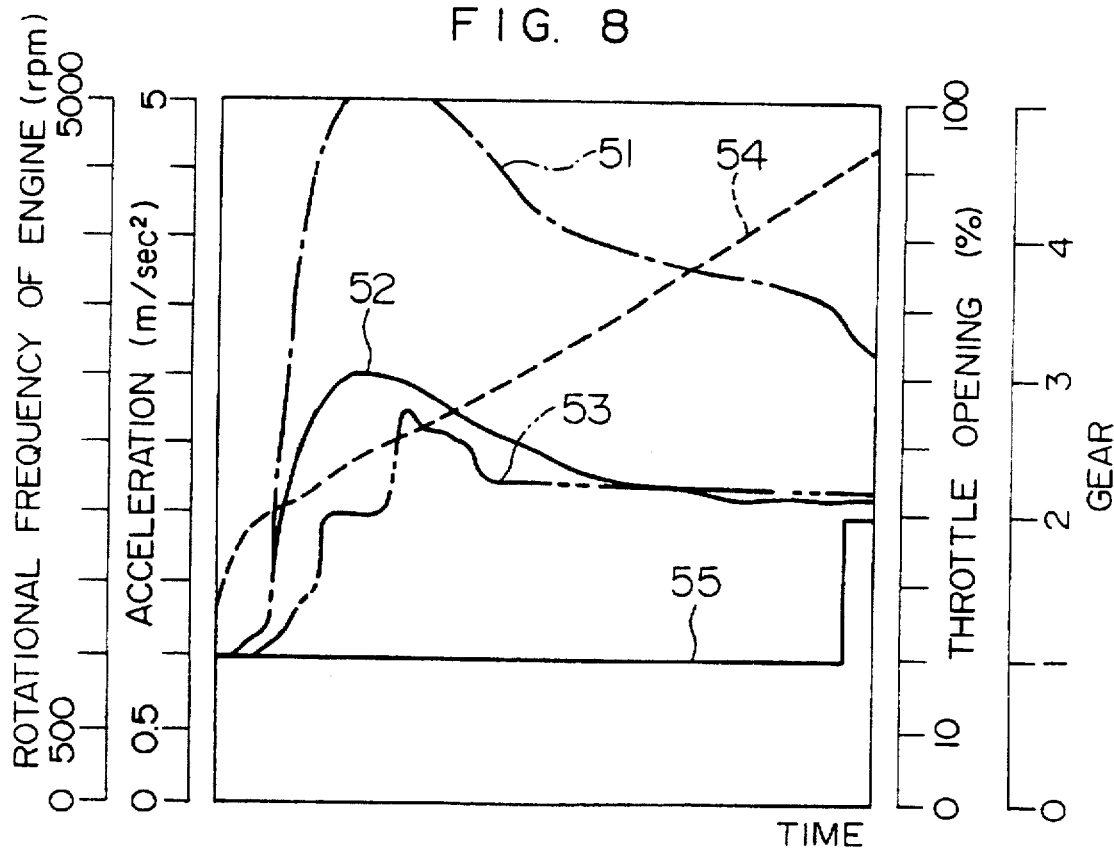
FIG. 8 is a characteristic graph showing time charts of reference acceleration, a real velocity and so on in a condition that a throttle opening is approximately 40% in a trailing mode.

FIG. 4 shows time charts of the above-mentioned parameters in a condition that the throttle opening is approximately 20% in the trailing mode. FIG. 5 shows time charts of the above-mentioned parameters in a condition that the throttle opening is approximately 30% in the normal mode. FIG. 6 shows time charts of the above-mentioned parameters in a condition that the throttle opening is approximately 30% in the trailing mode. FIG. 7 shows time charts of the above-mentioned parameters in a condition that the throttle opening is approximately 40% in the normal mode. FIG. 8 shows time charts of the above-mentioned parameters in a condition that the throttle opening is approximately 40% in the trailing mode.

It is apparent from these figures that the difference between the reference acceleration 51 and the real acceleration 52 is small in the normal mode whereas the difference between the reference acceleration 51 and the real acceleration 52 is large in the trailing mode. Therefore, it is possible to detect the load condition (acceleration resistance) of the vehicle according to whether a remainder obtained by subtracting the real acceleration 52 from the reference acceleration 51 exceeds the predetermined value A or not.

FIG. 9 shows an example in which different routes are searched by the vehicle navigation system in the normal mode and in the trailing mode (in which a loading mode is included).

Figure 9A:
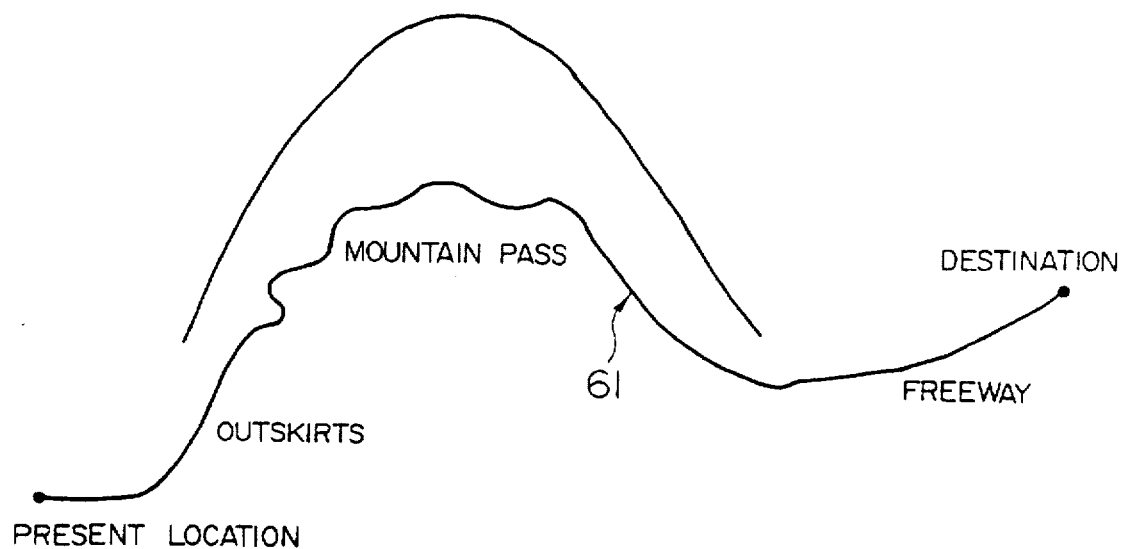
FIG. 9 is an explanatory diagram showing an example in which different routes are searched by the vehicle navigation system in a normal mode and in a trailing mode.

FIG. 9(a) shows a route 61 searched by the vehicle navigation system in the normal mode. As shown in this example, the route 61 of shortest in distance or in time is searched in the normal mode even if the route 61 includes a mountain path in it.

Figure 9B:
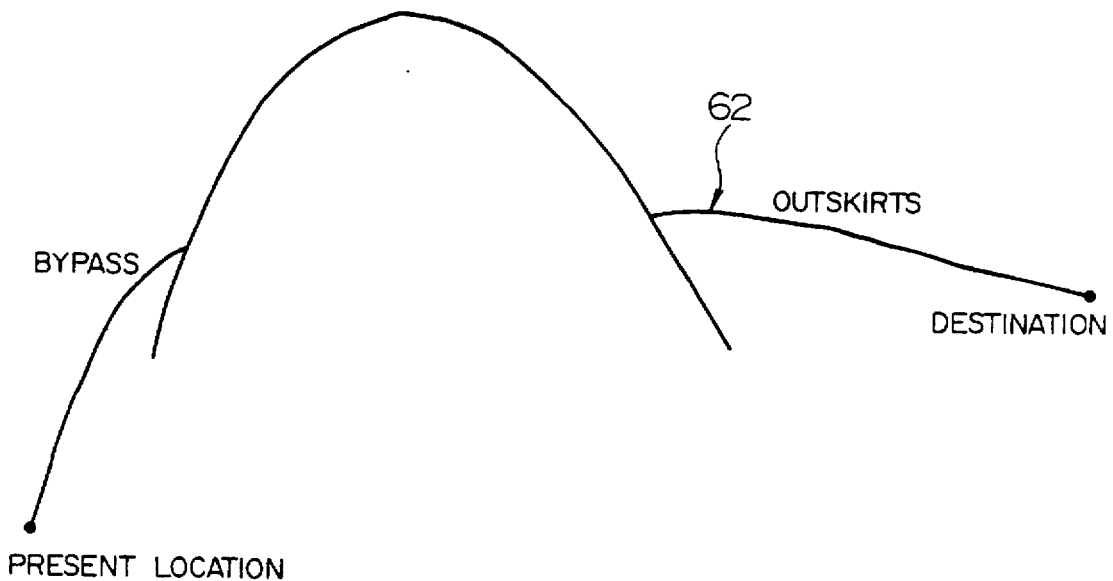

On the other hand, FIG. 9(b) shows a route searched by the vehicle navigation system in the trailing mode. As shown in this example, the route 62 that includes no road inadequate to drive such as the mountain path or the like is searched.

According to the present invention as mentioned above, extracting the roads possible to drive on the basis of the load condition (acceleration resistance) of the vehicle detected by the load condition detection unit 38 and the road data stored in the road data memory unit 151 of the map data memory unit 15. The route search and route guidance are done by utilizing the road possible to drive thus extracted so that it is possible to search the route suitable to drive and provide guidance thereof in accordance with load condition (acceleration resistance) of the vehicle.

Incidentally, the present invention is not limited by the above-mentioned embodiment, for example, the embodiment can be so modified to display only the roads possible to drive on the display 11a when the guidance is provided.

INDUSTRIAL APPLICABILITY

As mentioned above, the navigation system of the vehicle of the present invention is useful as a system for guiding a driving route of the vehicle. It is, in particular, preferable to the guiding driving route of the vehicle that drives with trailing or with loading.

We claim:

1. A navigation system of a vehicle comprising:

input means for inputting information including a destination;

store means for storing road information necessary for searching a route and for guiding the route;

acceleration resistance detection means for detecting acceleration resistance of the vehicle;

route search means for extracting an available road on the basis of the acceleration resistance detected by the acceleration resistance detection means and the road information stored in the store means, and for searching a route to the destination input from the input means by utilizing the available road thus extracted; and route guide means for providing route guidance according to the route searched by the route search means.

2. A navigation system of a vehicle set forth in claim 1, wherein the acceleration resistance detection means compares reference acceleration obtained from torque of an engine with real acceleration obtained from a velocity of the vehicle to detect the acceleration resistance of the vehicle.

* * * * *